United States Patent [19]

Plinke et al.

[11] Patent Number: 5,620,669
[45] Date of Patent: Apr. 15, 1997

[54] CATALYTIC FILTER MATERIAL AND METHOD OF MAKING SAME

[75] Inventors: Marc Plinke, Baltimore, Md.; Robert L. Sassa, Newark, Del.; William P. Mortimer, Jr., Conowingo, Md.; Glenn A. Brinckman, Wilmington, Del.

[73] Assignee: W. L. Gore & Associates, Inc., Newark, Del.

[21] Appl. No.: 515,195

[22] Filed: Aug. 15, 1995

[51] Int. Cl.$^6$ .......................... B01D 50/00; B01D 53/34
[52] U.S. Cl. ..................... 422/177; 428/36.2; 428/316.6; 502/242; 502/309; 96/135; 96/147; 55/385.3; 55/514; 442/31; 442/40
[58] Field of Search ..................... 422/171, 177, 422/190; 428/36.2, 234, 235, 236, 309.9, 316.6, 280; 502/242, 309; 96/135, 147; 95/90, 116; 55/385.3, 514

[56] References Cited

U.S. PATENT DOCUMENTS

| | | | |
|---|---|---|---|
| 3,925,248 | 12/1975 | Moroni et al. | 252/428 |
| 3,953,566 | 4/1976 | Gore | 264/288 |
| 3,962,153 | 6/1976 | Gore | 260/2.5 R |
| 4,042,352 | 8/1977 | Shiga et al. | 55/98 |
| 4,053,557 | 10/1977 | Kageyama | 423/240 |
| 4,096,227 | 6/1978 | Gore | 264/210 R |
| 4,187,390 | 2/1980 | Gore | 174/102 R |
| 4,220,633 | 9/1980 | Pirsh | 423/239 |
| 4,259,209 | 3/1981 | Nakane et al. | 252/430 |
| 4,309,386 | 1/1982 | Pirsh | 422/177 |
| 4,332,698 | 6/1982 | Bernstein et al. | 252/430 |
| 4,358,396 | 11/1982 | Bernstein et al. | 252/430 |
| 4,518,705 | 5/1985 | Solomon et al. | 502/101 |
| 4,728,503 | 3/1988 | Iida et al. | 422/169 |
| 4,732,879 | 3/1988 | Kalinowski et al. | 502/5 |
| 4,793,981 | 12/1988 | Doyle et al. | 423/139 |
| 4,833,877 | 5/1989 | Ahland et al. | 60/39.02 |
| 4,916,110 | 4/1990 | Manniso | 502/439 |
| 4,983,434 | 1/1991 | Sassa | 428/36.2 |
| 5,000,624 | 3/1991 | Steiger | 406/124 |
| 5,051,391 | 9/1991 | Tomisawa et al. | 502/242 |
| 5,064,792 | 11/1991 | Jaras et al. | 502/60 |
| 5,262,234 | 11/1993 | Minor et al. | 428/372 |
| 5,304,362 | 4/1994 | Madsen | 423/239.1 |
| 5,324,579 | 6/1994 | Sassa et al. | 428/280 |
| 5,342,434 | 8/1994 | Wu | 96/13 |
| 5,417,743 | 5/1995 | Dauber | 96/13 |
| 5,437,900 | 8/1995 | Kuzowski | 428/36.1 |
| 5,496,396 | 3/1996 | Allan et al. | 96/135 |
| 5,500,038 | 3/1996 | Dauber et al. | 96/135 |

FOREIGN PATENT DOCUMENTS

| | | |
|---|---|---|
| 0457480A1 | 11/1991 | European Pat. Off. . |
| 0468540A1 | 1/1992 | European Pat. Off. . |
| 0569877A1 | 11/1993 | European Pat. Off. . |
| 0470659B1 | 4/1994 | European Pat. Off. . |
| 3404277A1 | 8/1985 | Germany . |
| 3604946A1 | 4/1987 | Germany . |
| 253767A1 | 2/1988 | Germany . |
| 3633214A1 | 3/1988 | Germany . |
| 3642179A1 | 6/1988 | Germany . |
| 4025052A1 | 2/1992 | Germany . |
| 4216772A1 | 12/1993 | Germany . |
| 4215582C1 | 12/1993 | Germany . |
| 52-89560 | 7/1977 | Japan . |
| 52-98674 | 8/1977 | Japan . |

(List continued on next page.)

*Primary Examiner*—Nina Bhat
*Attorney, Agent, or Firm*—David J. Johns; Carol A. Lewis White

[57] ABSTRACT

The present invention is an improved catalytic filter material for use in removing contaminants such as $NO_x$ from a fluid stream. The filter of the present invention employs composite fibers of expanded polytetrafluoroethylene (PTFE) filled with catalytic particles. The composite fibers are chopped into staple fibers and made into a felt material. Preferably, the felt material is then laminated on at least one side with a protective microporous membrane. The combined filter removes both macro-particles, such as dust, from the filter stream before the dust can clog active catalytic sites and effectively catalytically coverts undesirable contaminants in the fluid stream to acceptable end products.

16 Claims, 6 Drawing Sheets

FOREIGN PATENT DOCUMENTS

| | | |
|---|---|---|
| 56-51230 | 5/1981 | Japan . |
| 3-277367 | 12/1991 | Japan . |
| 4-29720 | 1/1992 | Japan . |
| 4-235718 | 8/1992 | Japan . |
| 5-15782 | 1/1993 | Japan . |
| 6-334 | 1/1994 | Japan . |
| 9301807 | 11/1993 | Netherlands . |
| 2015543 | 9/1979 | United Kingdom . |
| 90/11817 | 10/1990 | WIPO . |

CATALYTIC FILTER MATERIAL AND METHOD OF MAKING SAME

BACKGROUND OF THE INVENTION

1. Field of the Invention

The present invention relates to a chemically and/or catalytically active particulate and gas filtration materials, such as those used in flue gas cleaning processes.

2. Description of Related Art

Catalytic filters are employed for a variety of gas filtering applications. Typically these filters combine some form of catalytic material (e.g., $TiO_2$, $V_2O_5$, $WO_3$, $Al_2O_3$, $MnO_2$, zeolites, and transition metals and their oxides) within some matrix. As the gas passes over or through the matrix, contaminants within the gas will react with active sites on the catalyst to convert the contaminants to a more desirable by-product. Examples of such include:

| Contaminant | Catalyst | Resulting Product(s) |
| --- | --- | --- |
| $NO_x$, $NH_3$ | $TiO_2$, $V_2O_3$, $WO_3$ | $N_2 + H_2O$ |
| CO | $Al_2O_3$, Pt | $CO_2$ |
| Dioxin/Furan | $TiO_2$, $V_2O_3$, $WO_3$ | $CO_2$, HCl |
| $O_3$ | $MnO_2$ | $O_2$ |

Examples of various previous attempts to produce a catalytic filter device include those set forth in U.S. Pat. Nos. 4,220,633 to Pirsh; 4,309,386 to Pirsh; JP 4-156479 to Norio Maki; EP 0,470,659 to Ekkehard, Weber; U.S. Pat. Nos. 4,053,557 to Kageyama Yoichi; 5,051,391 to Tomisawa et al.; 4,732,879 to Kalinowski et al.; DE 3,633,214 A1 to Dr. Hans Ranly.

In certain cases (e.g., U.S. Pat. No. 4,220,633 and U.S. Pat. No. 4,309,386) the filters have to collect substantial amounts of dust, such as that generated in a combustion process. After short collection times of between 1 minute and 6 hours, a layer of collected dust on the dirty side of the filter material increases the pressure drop across the filter and the filter has to be cleaned. (In many cases in situ.) During this cleaning cycle (e.g., a high energy air impulse system, a shaker system, a reverse air system, etc.), the outer dust layer falls off and a new filtration cycle can begin. Most catalytic filter materials today of which none are commercially available constitute a mesh of a regular woven or non-woven filter material in which the catalytically active particles are inserted as a foreign body. During the cleaning cycle, in which the filter material is exposed to high energy input and flexing, these particles are believed to abrade the host fibers at the fiber interception points and degrade the life of the filter.

Furthermore, inserted catalytic particles have the disadvantage that they increase the pressure drop of the filter material. In a filter which is used for particle collection, an optimal percentage of the filter will be occupied by fibers. If less fibers are used, the filter becomes weak and particulate collection will decrease. If more fibers are used, the filter will become stronger and collect dust particles at a higher efficiency but the pressure drop across the filter will increase above tolerated levels. Since catalytic particles on the surface of fibers will not increase fiber strength but rather fiber diameter, one will have to use at least the same amount of fibers as used for the original filter to obtain sufficient strength. In this case, the pressure drop increases significantly. On the other hand, if less fibers are used to keep pressure drop consistent, the resulting filter will be weaker.

In general it can be said that the more volume in a filter is occupied by noncatalytic constituents, the lower the catalytic activity per unit volume of the filler or the higher the pressure drop across the filter. In addition, the contact of the pollutant dust with the catalyst particles in the filter medium will decrease catalyst activity due to catalyst pore or active site clogging. In cases where glue is employed to help anchor the catalyst in place within the material, the glue tends to clog active sites on the catalyst and diminish its effectiveness. In cases in which catalyst particles are glued to solid surfaces, gases can only access the catalyst from the side which is directly facing to the fluid stream.

A number of other instances (e.g., Japanese Patent Application JP 4-235718 to Vilene Co., Ltd.) employ integrated catalysts and support matrix. While abrasion from loose particles can be reduced or avoided with this approach, these devices continue to have significant problems. First, many of these materials are relatively weak and tend to provide inadequate catalyst retention and/or are easily damaged during handling and use. This condition usually worsens as the quantity of catalyst is increased in the matrix.

Second, the catalytic filter must be thin and open enough to assure that gas can readily reach the active catalytic sites. Unfortunately, providing a thin and open structure decreases the strength and integrity of the filter material even further. While reinforcing materials or thicker or denser materials might be employed in the filter to increase its strength, the filter will undergo a resulting decrease in gas removal efficiency since there will be fewer fully exposed active catalytic sites for gas contact. Furthermore, denser or thicker material will cause an undesirable increase in the pressure drop through the material. These problems are particularly evident in Japanese Patent Application JP 4-235718 to Vilene, where it is taught that the catalytic material may need to have holes punched into it in order to produce adequate flow-through properties. Of course the use of through-holes is not entirely acceptable since gas flowing directly through macroscopic holes in the material will not contact any catalyst.

Third, contamination is a serious problem with virtually every previous catalytic filter device. Although by definition a catalyst is not consumed during the catalytic reaction, until the present invention catalytic filters may have limited operating lives due to particle contamination in a fluid stream (e.g., fine dust particles, metals, silica, salts, metal oxides, hydrocarbons, water, acid gases, phosphorous, alkaline metals, arsenic, alkali oxides, etc.). Over time, these aerosols tend to become embedded within the filter matrix, thus blocking the pores of the catalyst and, therefore, minimize the surface area and access to the active sites of the catalyst. Unless these particles can be shed from the filter, the filter will rapidly diminish in efficiency until it must be replaced. As has been noted, a variety of cleaning apparatus exists to remove dust from filter apparatus (e.g., shaker filter bags, back-pulse filter bags and cartridges, reverse air filter bags, etc.), but these devices are not expected to be particularly effective at removing dust from current integrated catalytic filter materials. This is due to the filter's overall weakness, preventing its rigorous handling; and the intricacies of the filter structure, making it very difficult to remove particles from the matrix once they have become embedded therein.

Accordingly, it is a primary purpose of the present invention to provide a catalytic filter material that is effective at catalytically converting contaminants in a fluid stream. Fluid streams in this invention are gas and liquid streams.

It is a further purpose of the present invention to provide a catalytic filter material that has improved strength and a more open structure over existing catalytic filter designs. Within the new filter structure, pollutant molecules can access the catalyst particles from all sides.

It is yet another purpose of the present invention to provide a catalytic filter that can be effectively cleaned, with minimum contamination of the catalytic particles, so that the filter has an extended effective operating life.

These and other purposes of the present invention will become evident from review of the following specification.

SUMMARY OF THE INVENTION

The present invention is an improved catalytic filter device for use in converting contaminants found in a fluid stream from an undesirable substance, such as $NO_x$, to an acceptable end-product, such as water or $N_2$. The present invention differs from previous catalytic filter products in a number of important respects. First, the filter comprises catalytic particles that are attached within the polymeric node and fibril structure of fibers of expanded polytetrafluoroethylene (ePTFE). Preferably, the fibers are "towed" (i.e., partially ripped apart) using a towing process to produce an open, intertangled web of fibers. A non-woven structure is then formed from the web of fibers. This has proven to be a very strong and very open catalytic filter material. As a result, the catalytic material of the present invention can be made into a thicker filter product (i.e., 1–5 mm or more in thickness) than previous catalytic filters without producing an unacceptable pressure drop. Further, the use of small particles with high surface area which can be accessed from all sides by polluting molecules allows for greater catalytic activity than has been previously possible.

Another important improvement of the present invention is that its increased strength and its intimate adhesion to catalytic particles make the material perfect for use in demanding environments, such as with shaker bag, reverse air, or pulse-jet filter cleaning assemblies. Since towed ePTFE fiber material is quite strong and resistant to abrasion, it can readily withstand the flexing and rigorous handling of self-cleaning filter apparatus. Moreover, the adhesion of the catalytic particles to the node and fibril structure of the ePTFE greatly reduces the abrasion that might otherwise occur by the rubbing of particles against fabric during the operation and cleaning of the filter apparatus.

To further improve the operative life of the present invention, it is preferred that a microporous membrane of expanded PTFE be mounted on at least the upstream side of the filter apparatus when particles are present in the gas stream (when no particles are in the gas stream, the membrane may not be necessary). The ePTFE membrane provides a pre-filter to separate dust particles and other contaminants from the gas stream. The result is that dust particles will form into a cake on the outside of the ePTFE membrane and will not become embedded within the catalytic filter material. Shaker or back-pulse cleaning becomes easy under these circumstances since the dust will readily separate from the microporous ePTFE membrane with PTFE's low surface energy. The enhanced cleanability allows the filter to be repeatedly regenerated without the performance loss that can occur when dust begins to contaminate the catalyst particles. For some uses, it may also be useful to add a microporous membrane that is filled with catalytic particles or other material to provide additional levels of filtration or other useful properties. In addition, the addition of the ePTFE (or other) membrane to the catalytic backup material removes the backup material from its dust removing duties. In this case, many more degrees of freedom in catalytic backup material construction are gained. Filters can be made more or less dense, with a higher or lower thickness, more or less tortuous to the gas flow, or with a higher or lower strength.

The present invention can also be used in cross flow situations in which the rough fibrous structure ensures good fluid mixing due to enhanced turbulent fluid flow and therefore, an intense contact between the fluid stream and the catalyst particles. Also, a fibrous structure increases fluid-catalyst contact because boundary layer effects, which are most pronounced on smooth surfaces, will not limit contamination gas molecule transport to the catalyst.

A number of unique process steps also distinguish the present invention. The preferred process comprises:

1) An active catalyst with very low particle sizes is combined with a PTFE resin and then expanded to produce a structure whereby the catalyst particles are almost completely exposed to the surrounding air and only connected by very fine fibrils of PTFE, giving the whole structure extensive strength and excellent reactivity with the targeted gases.

The path of the fluid passing through the filter is tortuous because no straight pores exits.

2) The catalytic structure is cut into fine catalytic fibers without destroying the node and fibril structure. Preferably this is done by towing the fibers to make them into a tangled web of interconnected fibers;

3) The catalytic fibers may be mixed with regular ePTFE fibers or other fibers to provide increased strength;

4) Preferably the mixture of catalytic and ePTFE fibers is then carded and needled into a backing material (e.g., a scrim) to obtain a needle felt.

5) As has been noted, the needle felt material then can be mounted to a microporous sheet of ePTFE to serve to protect the felt from dust particle contamination in the fluid stream.

This manufacturing process allows a wide range of filter parameter changes such as catalyst loading, filter thickness, filter permeability, flow field around the catalyst particles (a unique mixture of flow through and flow by with excellent gas/catalyst contact), filter strength, and catalyst protection.

DESCRIPTION OF THE DRAWINGS

The operation of the present invention should become apparent from the following description when considered in conjunction with the accompanying drawings, in which.

DETAILED DESCRIPTION OF THE INVENTION

The current invention is an improved catalytic filter material. With this filter, pollutant gas components, such as NOx, Dioxin/Furan, CO, and others, can be catalytically altered (i.e., reduced or oxidized) into non-polluting or less polluting gas components. In addition, particulates in the gas stream can be separated and collected in the filter with high efficiencies.

The present invention is directed to a wide variety of filter applications. The terms "filter" and "filtration" as used in the present application is intended to encompass any device that blocks or traps particles and/or modifies particles or molecules passing through the device. The use of the term "fluid" in the present invention is intended to encompass any form of readily flowing material, including liquids and gases.

Figure 1:
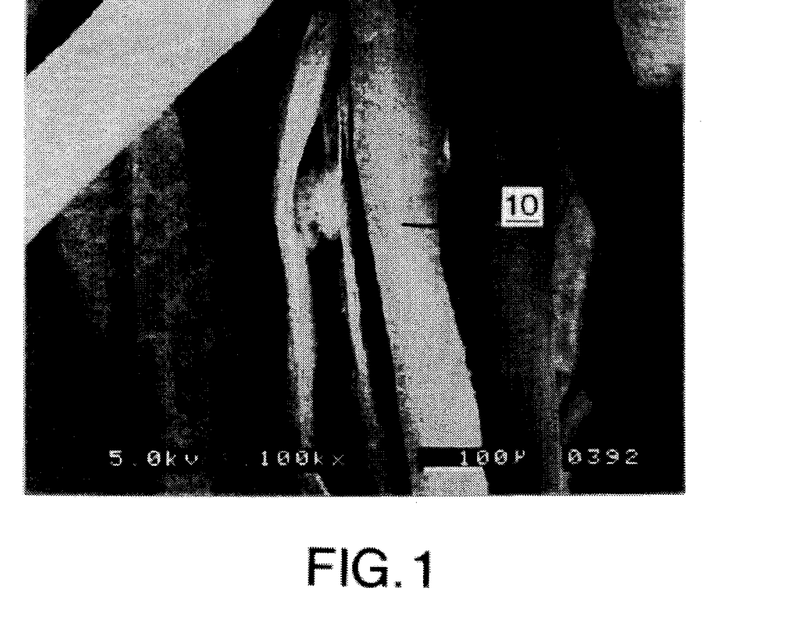
FIG. 1 is a scanning electron micrograph (SEM) of a number of catalyst loaded expanded polytetrafluoroethylene (ePTFE) fibers employed in the present invention, enlarged 100 times.
Figure 2:
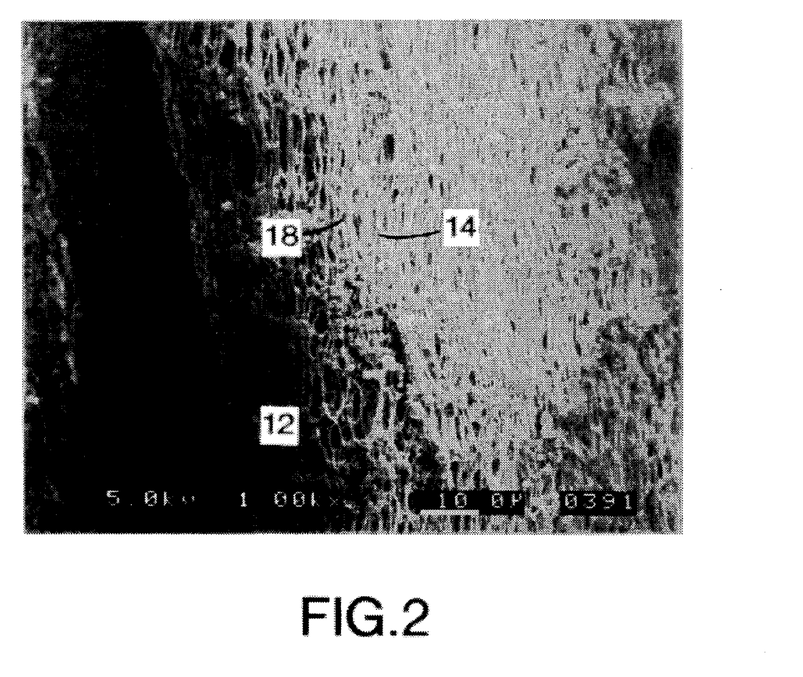
FIG. 2 is a scanning electron micrograph (SEM) of a catalyst loaded fiber employed in the present invention, enlarged 1,000 times.
Figure 3:
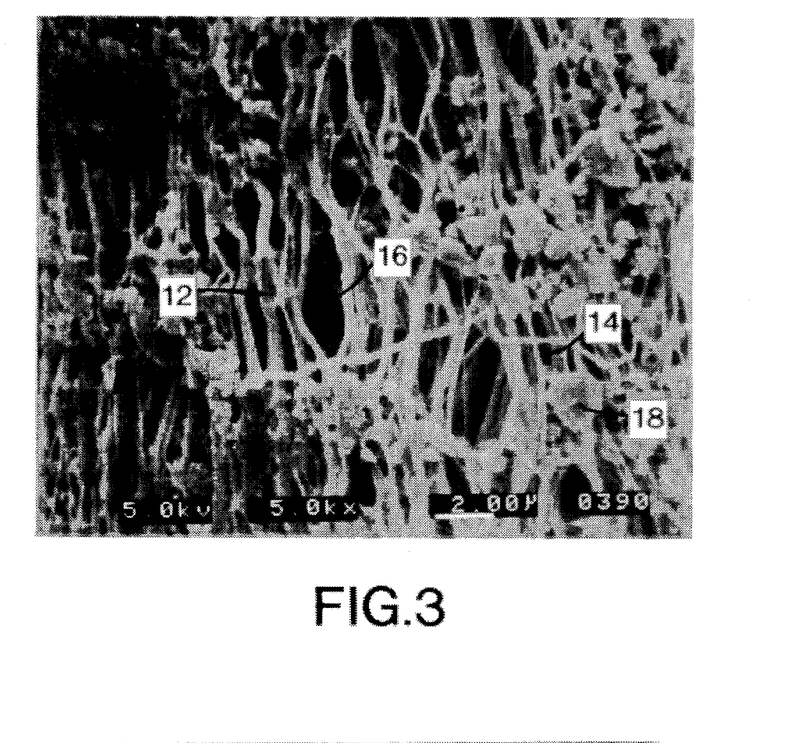
FIG. 3 is a scanning electron micrograph (SEM) of a catalytic fiber employed in the present invention, enlarged 5,000 times.

FIGS. 1 through 3 show catalytic fibers 10 of the present invention at three different magnification levels. The fiber 10 comprises an expanded polytetrafluoroethylene (ePTFE) that is composed of polymeric nodes 12 and interconnecting fibrils 14. The production of this basic expanded PTFE structure is taught in a number of patents, including U.S. Pat. Nos. 3,953,566, 3,962,153, 4,096,227, and 4,187,390, all incorporated by reference. By the terms "fibrils" and "nodes," it is intended to define a wide variety of materials such as those made in accordance with these patents and improvements thereto. "Fibrils" are intended to define small polymeric strands (such as, on the order of a few microns or less in diameter). "Nodes" are intended to define any structure attached to such fibrils, from relatively large polymer masses or particles (such as, up to 10 to 50 microns or more across) to mere intersect points of two or more fibrils.

Expanded PTFE has a number of desirable properties that makes it particularly excellent filtration material. For example, expanded PTFE material has many microscopic holes or "micropores" 16, such as on the order of 0.1 to 10 μm across, that allow gases to pass through but restricts the passage of larger materials, such as fine dust, etc. It should be appreciated that pore size of the fibers may be varied dramatically within the scope of the present invention ranging from less than 0.05 μm to over 100 μm across. Further, expanded PTFE has the demonstrated ability to be treated to selectively allow or restrict the passage of liquid water and/or water vapor. Finally, expanded PTFE is very strong and inert, allowing it to be used with a wide variety of materials and under a wide array of environmental conditions (including at temperatures up to about 260° C. continuous, and even up to 290° C. for short durations).

The filter material of the present invention attaches catalytic particles directly to the microstructure of the expanded PTFE. As can be seen in FIGS. 2 and 3, particles of catalyst 18 are attached to and within the nodes and fibrils of the expanded PTFE. As is explained below, the catalytic particles 18 are introduced during the processing of the expanded PTFE itself so as to produce a stable microporous material with the particles securely attached to the fibrils 14 themselves. Preferably, the surface of the catalyst particles is covered with a minimal amount of PTFE so as to maximize the reactivity of the catalyst.

The preferred material of the present invention is made in the following manner. A catalytic filler is incorporated into an aqueous dispersion of dispersion-produced PTFE. The filler in small particle form is ordinarily less than 40 microns in size, and preferably less than 15 micron. By "particles" is meant a material having any aspect ratio and thus includes flakes, fibers and spherical and nonspherical powders.

Examples of suitable fillers for use in the present invention include: Noble (gold, silver, palladium, rhodium, etc. ) or non-noble metallic catalysts may be utilized. For example, platinum (a noble metal), iron base ammonia decomposition catalyst, iron chromium oxide mixtures, zirconium promoted lanthanum cuprate, and the various oxides of copper, iron, vanadium, cobalt, molybdenum, manganese, and tungsten may be employed with the instant invention. The foregoing recitation is not meant to be exhaustive, rather, other suitable catalysts may be employed as well. Other reagent/catalyst include transition metal oxides of nickel, zinc; alumina (particular gamma phase) silicone, zirconium, chormium, ruthenium, tin, and alkalized alumina; alkali and alkaline earth oxides and carbonates; and minerals such as dawsonite, analcite, magnesioriebeckite, feldspars, alunite, anataso, azurite, bauxite, bunsanite, gothire, hematite, iron spinel, ilmenito, malachite, manganite, manganosite, mellite, siderite, and spinel.

The filler is introduced prior to co-coagulation in an amount that will provide 1 to 99%, and preferably 30% to 90% by volume, solid-to-solid volume filler in the PTFE in relation to the final composite material (not including air content). The filled PTFE dispersion is then co-coagulated, usually by rapid stirring and the coagulated filled PTFE is dried. The filled material is then lubricated with a common paste extrusion lubricant, such as mineral spirits or glycols, and paste extruded.

The extrudate is usually calendered, and then rapidly stretched to 1.2x to 5000x, preferably 2x to 100x, at a stretch rate of over 10% per second at a temperature of between 35° C. and 410° C. The lubricant can be removed from the extrudate prior to stretching, if desired.

Figure 5:
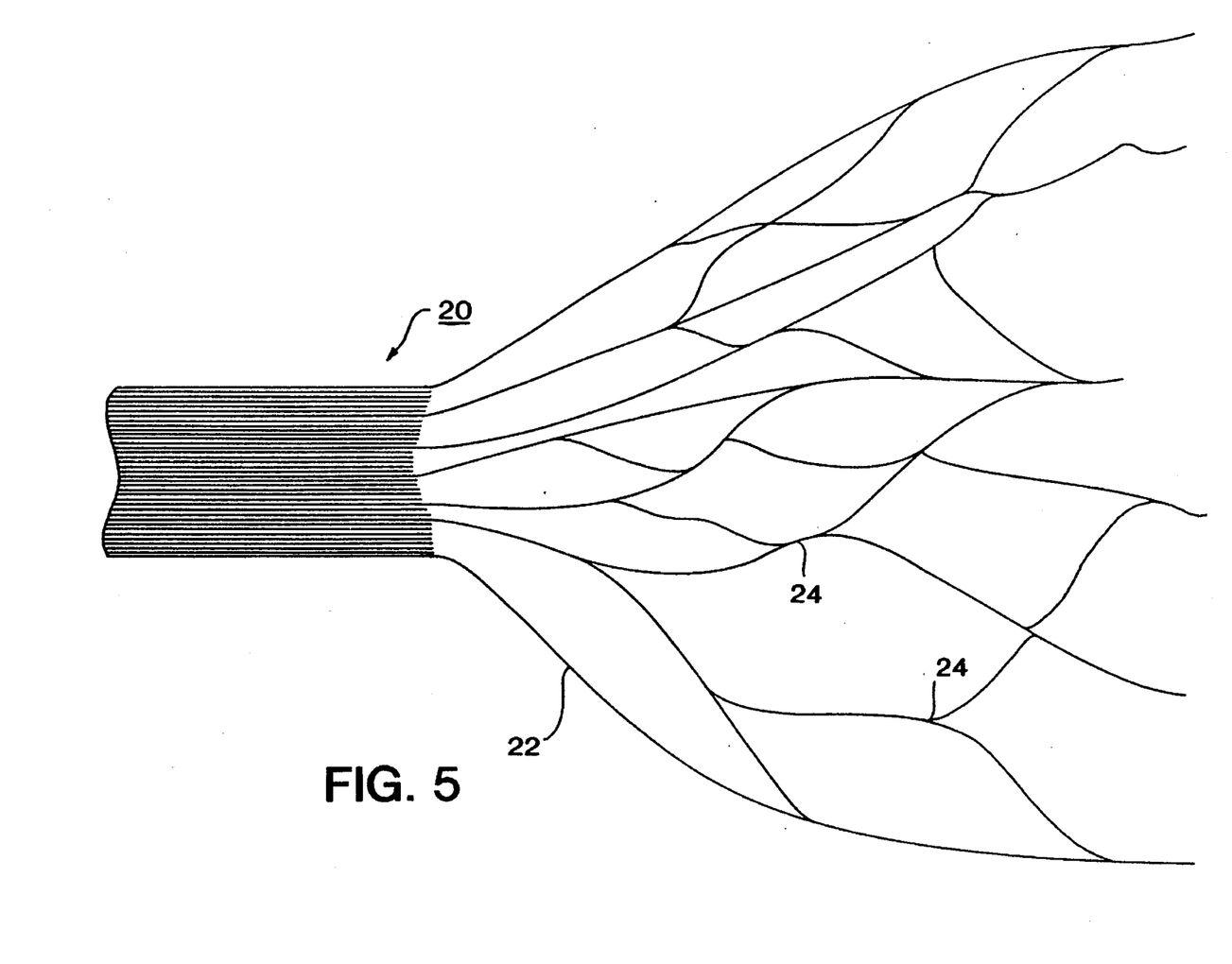
FIG. 5 is a schematic representation of a tow fiber employed in the present invention.

Preferably, the catalyst-filled material of the present invention is formed into a felt. One suitable means of forming such a felt is in the following manner. A catalytically active ePTFE fiber is produced from a catalytic tape of ePTFE produced from a wet mixture of 1 to 99% by volume, preferably 30 to 90% by volume, catalyst (e.g., titanium dioxide catalyst from BASF, Ludwigshafen, Germany) and 99 to 1% by volume, preferably 70 to 10% by volume, PTFE resin (e.g., PTFE dispersion available from E. I. duPont de Nemours and Co., Wilmington, Del.). The tape is slit along its length into multiple strips, expanded, and processed over a rotating pinwheel to form a tow yarn. A representation of tow yarn 20 is shown in FIG. 5. As can be seen, once the yarn passes through the pin wheel, a "spider web" of fine fibers 22 is formed that are connected together at random points 24 along the tow 20. This is accomplished by puling a catalyst-filled tape of PTFE through spiked pinwheels. By providing the pinwheels with a higher velocity than the speed of the tape, the material is slit to form the web structure shown. This process produces a very open structure with a high percentage of open and exposed surface area. Once the tow is formed, the tow yarn is then chopped into short staple fibers. The staple fibers should be about 0.2 to 25 cm, preferably 2 to 12 cm (and especially about 5 cm) in length.

The staple fibers are then needle punched into a scrim backing material to form a felt. Preferably, a woven scrim is used made from ePTFE weaving fiber (e.g., 440 decitex RASTEX® fiber, available from W. L. Gore and Associates, Inc., Elkton, Md.). The scrim preferably comprises a thread count of approximately 16×8 threads/cm, resulting in a weight of approximately 130 g/m². It should be understood that the scrim may be produced from catalyst-containing material was well. The staple fibers are fed into conventional carding equipment (e.g., available from Davis and Furber of Andover, Mass.). The carded web is crosslapped onto a scrim and tacked together by a needle loom. The web is then crosslapped onto the other side of the scrim and needled again. The felt should be needle punched several times to interlock the staple fibers to the scrim sufficiently. This product may then be heat set while being restrained in the cross machine direction for several minutes to improve the thermal stability. The final felt preferably has a weight of approximately 300 to 3000 g/m² (with a weight of less than about 1500 g/m² generally preferred), an air permeability of approximately 4 to 60 m/min @11 mm water gauge, and a thickness of approximately 2 to 15 mm.

The felt material may then be coated with an adhesive material. Preferably the adhesive material comprises a fluorinated ethylene propylene copolymer (FEP) aqueous dispersion (e.g., T120 available from E. I. duPont de Nemours and Co.). Other lamination aids are PTFE dispersions, fluoropolymers, polyimides, sulfur (polyphenylene sulfide, etc.). The felt is then dried (e.g., in an oven at about 200° C.–250° C. for about 2 to 10 min).

For protection of the felt material, a layer of porous membrane may be laminated on the coated side of the felt. The preferred membrane comprises an expanded PTFE with an air permeability of about 0.3 to 200 m/min @12 mm water gauge. Preferred air permeability is about 6 m/min @12 mm water gauge. To achieve bonding, the felt is subjected to heat and pressure to soften the dried FEP aqueous dispersion. The resulting fabric laminate had good strength between the porous expanded PTFE membrane and the felt. Preferably the final material has an air permeability of about 1 to 10 m/min @12 mm water gauge with excellent filtration efficiency of solid particulates.

A further improvement in this material is to form the felt from a combination of both catalyst filled material and another material. For instance, a staple fiber may be produced from an unfilled fiber of expanded porous PTFE. The catalytically active ePTFE fiber and the synthetic fiber of expanded porous PTFE may then be blended to form a hybrid mixture within a broad range of 100:1 to 1:100. Preferably the mixture comprises approximately 10:1 to 1:5 catalytic to noncatalytic by weight of the two staple fibers. For most applications, a mixture of at least about 50% catalytic fiber is ideal.

The blended hybrid mixture is then placed in a carding machine and processed in the manner described above. The final felt preferably has a weight of approximately 300 to 3000 g/m², an air permeability of approximately 4 to 60 m/min @12 mm water gauge, and a thickness of approximately 2 to 15 mm. Following lamination, the final material has an air permeability of about 1 to 10 m/min @12 mm water gauge.

Figure 4:
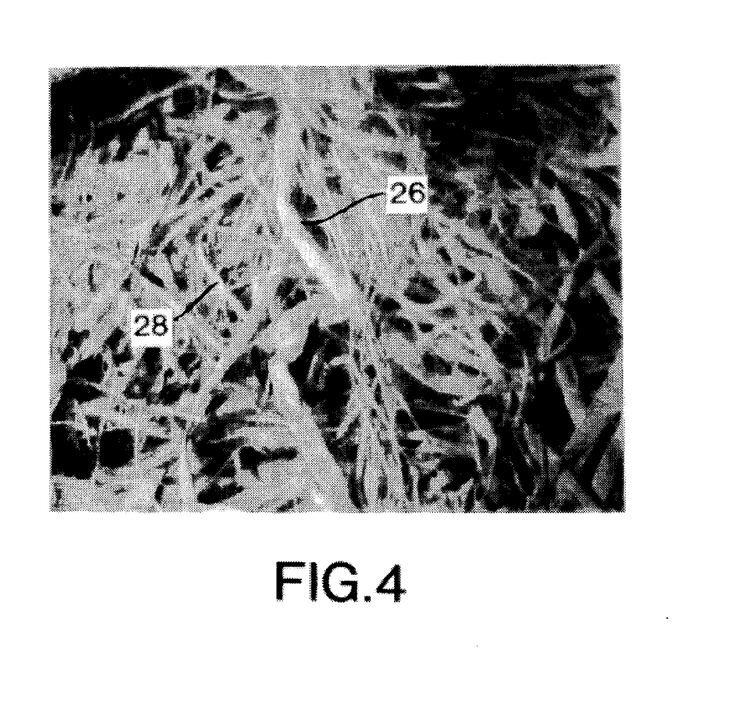
FIG. 4 is a microscopic photograph, enlarged 5:1, of a coherent catalytic filter material of the present invention comprising a mixture of catalyst loaded ePTFE fibers and unfilled ePTFE fibers.

FIG. 4 shows the resulting structure of this hybrid material. As can be seen, the material comprises both strands of catalytic fibers 26 and strands of unfilled fibers 28. The two kinds of strands 26, 28 are randomly intermingled with each other. The open structure of this material allows for ready air access into and around the catalytic fibers, while the non-catalytic fibers lend strength to the felt.

Figure 6:
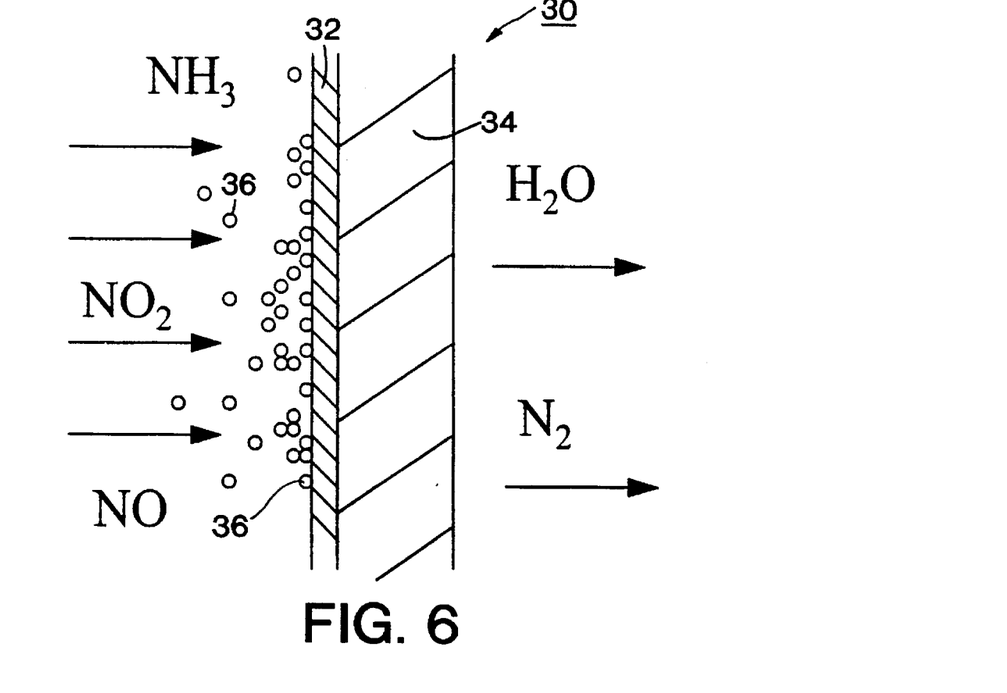
FIG. 6 is a cross-section schematic representation of one embodiment of a catalytic filter device of the present invention.

FIG. 6 shows how a new filter 30 of the present can be made. To protect the catalyst material from contamination (such as, from dust or other material blocking catalytic sites), in this embodiment, a protective microporous membrane 32 is laminated to the catalytic filter material 34. In this configuration, dust particles 36 and adsorbed pollutants on these dust particles are blocked by the protective membrane 32 and cannot come into contact with the catalyst particles attached with the filter material 34. This provides significantly improved protection of the catalytic filter material 34 and vastly longer effective life for the filter 30. While a variety of protective membranes 32 may be employed, it is particularly preferred to employ an expanded PTFE membrane due to its exceptional filtration properties. Additionally, an expanded PTFE membrane can be readily cleaned of accumulated contaminants, vastly increasing the operative life of the filter 30.

The filter illustrated in FIG. 6 is particularly suited for use in treating pollutant gases and particulates therein. For instance, by employing a catalyst of $TiO_2$, $V_2O_3$, and $WO_3$, pollutants of $NO$, $NO_2$, and $NH_3$ will readily be modified into $H_2O$ and $N_2$.

Figure 7:
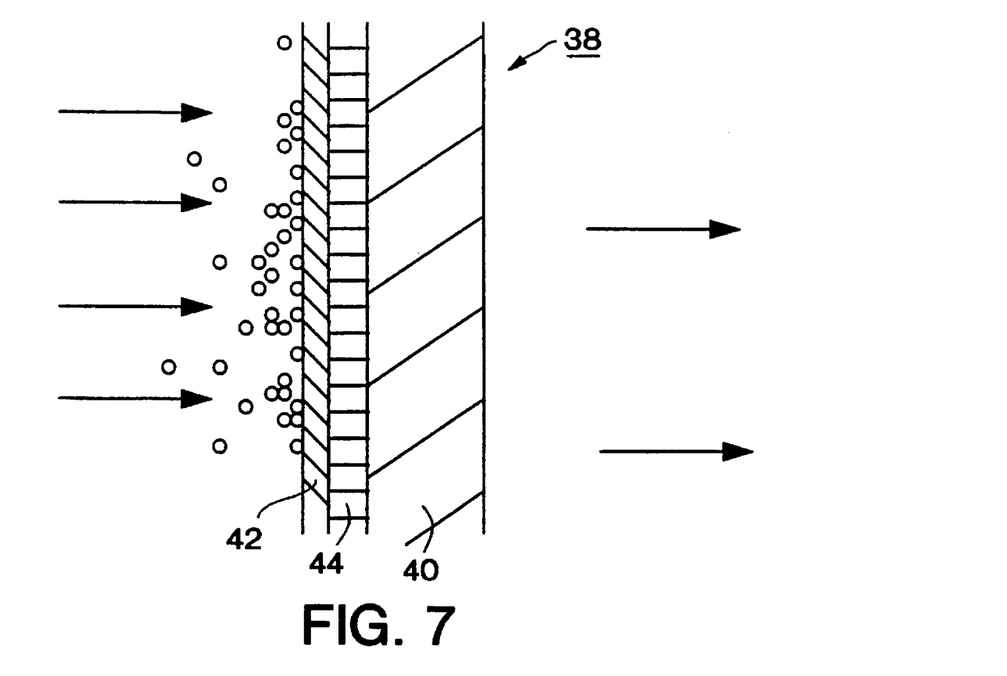
FIG. 7 is a cross-section schematic representation of another embodiment of a catalytic filter device of the present invention.

If the gas-catalyst reaction is instantaneous, and the catalyst is very expensive, it might be desirable to make only a thin catalytic layer that may be active enough to convert all pollutant gases. In this case a further backup or support layer can be laminated into the filter assembly. As is shown in FIG. 7, a filter 38 is shown having a catalytic filter layer 40, a porous protective layer 42, and a sorptive layer 44. The sorptive layer 44 can be mounted either upstream or downstream of the protective membrane 42 or the catalytic filter layer 40. In most cases it is preferred that the sorptive layer 44 be mounted between the protective membrane 42 and the catalytic filter layer 40, as shown. The sorptive layer 44 serves to absorb or adsorb other poisons and pollutants in the fluid stream. This layer may be formed from any suitable sorptive material, including carbon filled felt or weaves, etc.

Figure 8:
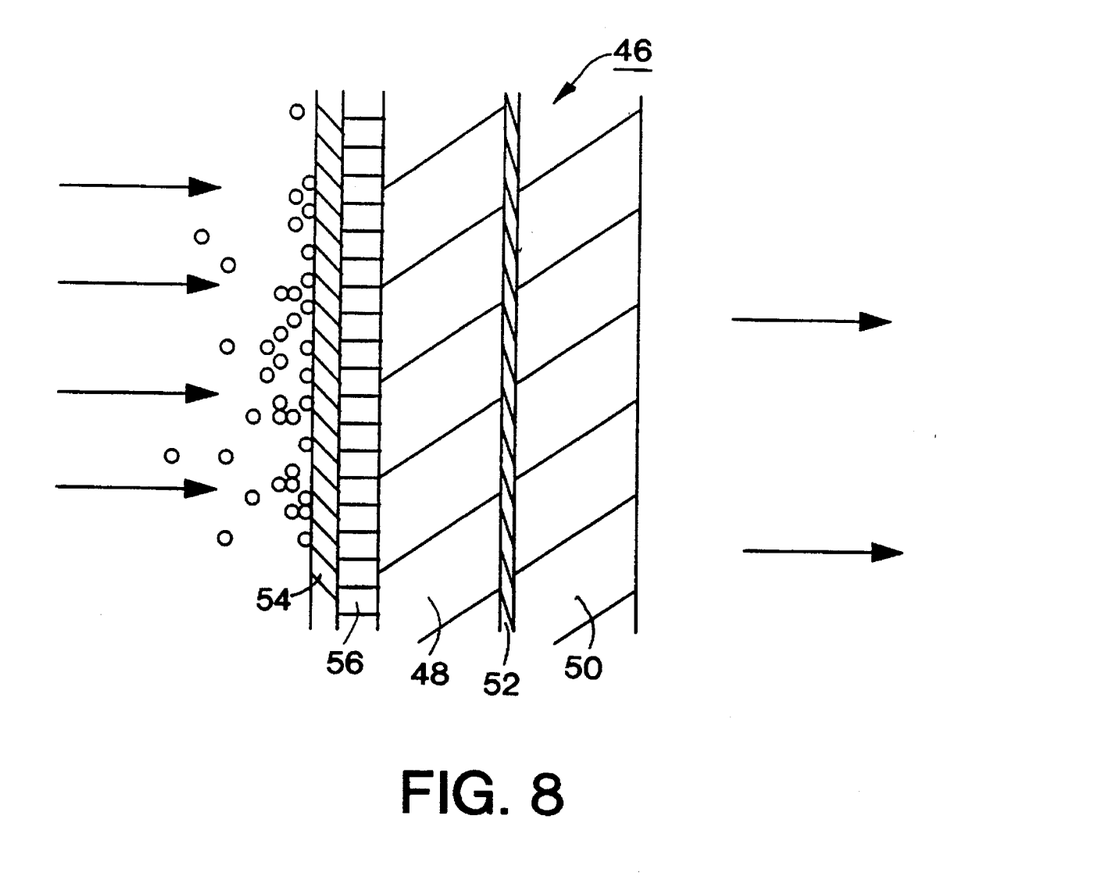
FIG. 8 is a cross-section schematic representation of still another embodiment of a catalytic filter device of the present invention.

The catalytic filter of the present invention may be combined with other filter components with additional beneficial results. For instance, if other gas components threaten to poison the catalytic filter layer, a further protective catalytic layer may be inserted anywhere upstream of the catalytic layer, as is shown in FIG. 8. The filter unit 46 of FIG. 8 employs a first catalytic layer 48 and a second catalytic layer 50. Although not always necessary, it may be desirable to include a layer of material 52 between the two layers 48, 50 to isolate the layers from each other and/or to provide some other function (e.g., scrim, absorption, liquid separation, further catalytic function, etc.) Again, a protective layer 54 and sorptive layer 56 are provided upstream. Although the two filter layers 48, 50 may use identical or similar catalytic materials, it is contemplated to be particularly useful to provide different catalytic layers so as to improve the overall functioning of the filter. For instance, while one catalytic layer may catalytically reduce $NO_x$, the other could catalytically oxidize $CO$ to $CO_2$. In addition, a second or third layer could adsorb $SO_3$ which poisons some of the other catalysts.

Figure 9:
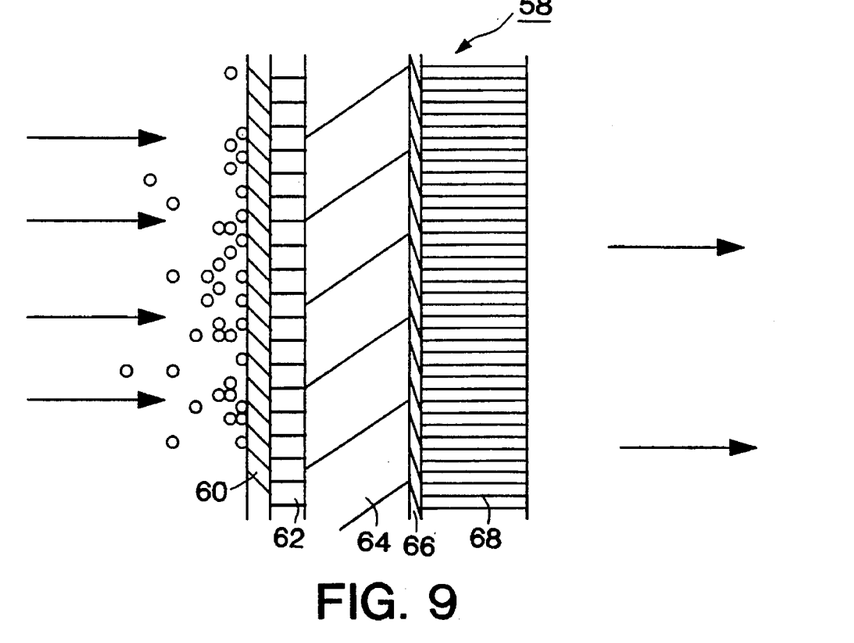
FIG. 9 is a cross-section schematic representation of yet another embodiment of a catalytic filter device of the present invention.

FIG. 9 illustrates a further example of how multiple layers of filtration material can be combined in the filter device of the present invention. In this embodiment, the filter device 58 comprises a first protective layer 60, a sorptive layer 62, a catalytic layer 64, a sorptive layer 66, and a second protective layer 68. The sorptive layer 66 is preferably one that can absorb or adsorb undesirable materials from the fluid stream before it exits the filter device, such as a carbon-filled polymer. The use of a second protective layer 68 is believed to provide better containment and protection of the active layers within the filter device 58 and to provide resistance to distortion of the filter device when it is place in a strong fluid stream or in direct contact with filter support materials such as filter cages. Ideally, the second protective layer 68 should be constructed from a strong, porous, and abrasion-resistant material, such as a polymer felt or mesh.

Figure 10:
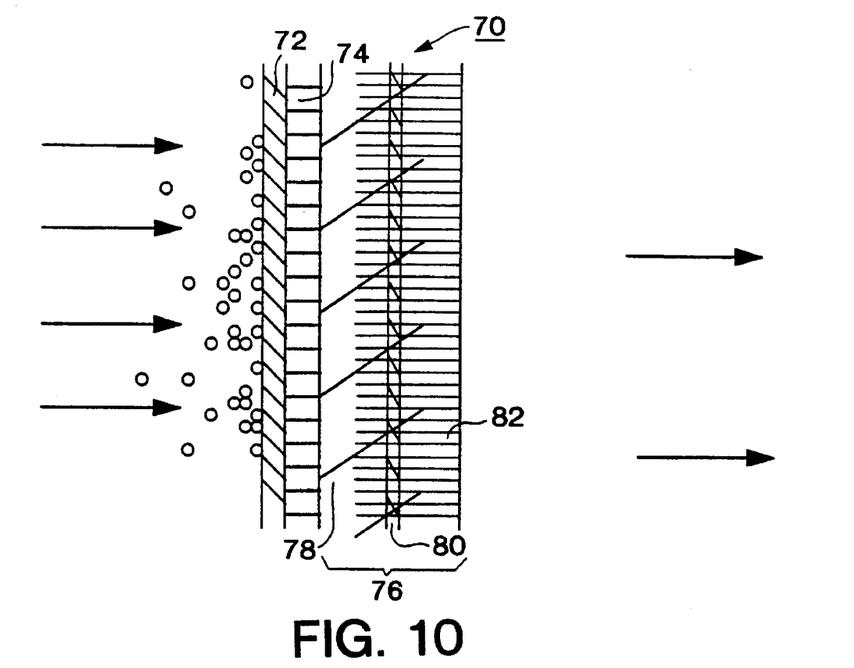
FIG. 10 is cross-sectional view of a further embodiment of a filter device of the present invention.

Still another example of a multiple layer construction of a filter device 70 of the present invention is illustrated in FIG. 10. In this embodiment, the filter device 70 comprises a first protective layer 72, a support layer 74, and an integrated layer 76 that includes a catalytic layer portion 78, an absorptive layer portion 80, and a protective layer portion 82. The integrated layer 76 essentially combines the protective layer and the active layers 78, 80 into a coherent unit. Preferably, such combination is accomplished by forming the protective layer in a scrim needled punched to form a felt of catalytic fibers. The absorptive layer 80 may likewise be combined into the felt, such as in the form of a needled punched filled membrane, filled fibers, loose absorptive material, etc. Alternatively, this integrated layer 76 may be constructed of only the catalytic layer 78 and the protective layer 82, with the absorptive layer 80 not used or applied separately.

It should be appreciated that there are numerous permutations of filter apparatus that can be made in accordance with the present invention. Among the combinations of material contemplated by the present invention are: (1) using catalytic felt alone; (2) covering catalytic felt with one or more covers of particle filtration material (such as, unfilled microporous PTFE membrane); (3) covering the catalytic felt with one or more covers of other filtration material (such as microporous PTFE filled with one or more kinds of catalytic material; (4) covering the catalytic felt with two or more covers of different constructions, such as two different covers, each providing a different catalytic material; (5) constructing a filter apparatus with multiple layers of catalytic felt (with similar or different construction); or (6) combining any of these or other filter constructions. The different layers may be mounted by lamination felting, needle felting, or without binding mechanism.

Without intending to limit the scope of the present invention, the following examples illustrate how the present invention may be made and used:

EXAMPLE 1

A slurry of 2170 g $TiO_2$, $V_2O_5$, $WO_3$ such as catalyst particles converted from BASF monolith filter available from BASF Ludwigshafen, Germany (converted from BASF Catalyst O-85) was prepared in a 40 liter container. While the slurry was agitated at about 300 rpm, 1280 g PTFE in the form of a 27.6% solids dispersion was rapidly poured into the mixing vessel. The PTFE dispersion was an aqueous dispersion obtained from E. I. duPont de Nemours and Company, Wilmington, Del. About 30 sec. later, 3.4 liters of a 0.4% solution of modified cationic polyacrylimide solution (such as SEDIPURE solution from BASF) in deionized water was added. After adding SEDIPURE solution, the mixture coagulated within 1 min 45 sec. The coagulum was gently poured over a porous cheesecloth and allowed to air dry. The flitrate from this process was clear.

The coagulum was dried in a convection oven with a maximum temperature of about 165° C. for 24 hours. The material dried in small, cracked cakes approximately 2 cm thick and was chilled to below 0° C. The chilled cake was hand-ground using a tight, circular motion and minimal downward force through a 0.635 cm mesh stainless steel screen, then 0.64 g of mineral spirits per gram of powder was added. The mixture was chilled and tumbled for 5 minutes, then allowed to sit at 25° C. overnight and was rerumbled for 5 minutes.

A pellet was formed in a cylinder by pulling a vacuum and pressing at 853 psi. The pellet was then heated to 49° C. in a sealed tube. The pellet was then extruded into a 6"×0.080" tape form. The tape was then calendered through rolls to a thickness of 0.020 inch. The lubricant was evaporated by running the tape across heated rolls. The tape was stretched in the machine direction at a 2 to 1 ratio, 270° C., 105 ft/min. A thin porous tape was produced with a porosity of approximately 84% and a final thickness of about 10 mils.

EXAMPLE 2

A felt of the present invention was produced in the following manner. A catalytic active ePTFE fiber was produced from a catalytic tape of ePTFE produced from a wet mixture of 50% by volume titanium dioxide catalyst (completed from BASF O-85) and 50% PTFE resin (duPont) in accordance with the steps outlined in Example 1, above. The tape was slit along its length into three strips, expanded, and processed over a rotating pinwheel to form a tow yarn. The tow yarn was then chopped to 5 cm length staple fiber.

A similar staple was also produced from a synthetic fiber of expanded porous PTFE. The catalytically active ePTFE fiber and the synthetic fiber of expanded porous PTFE were opened in a shear air field and then collected in boxes for additional processing. A blend of the two staple fibers was then produced by hand carding (mixing) 50% by weight catalytic ePTFE fiber and 50% by weight synthetic fiber. The hand carded filter material was determined to be catalytically active and has a removal efficiency for $NO_2$ of over 80%.

EXAMPLE 3

A woven scrim is made out of 440 decitex ePTFE weaving fiber, (RASTEX® fiber, available from W. L. Gore and Associates, Inc., Elkton, Md.). The scrim is constructed with a thread count of 16×8 threads/cm resulting a weight of approximately 130 $g/m^2$.

A catalytic felt can also be made using the blend of the two staple fibers made according to Example 2.

The blended staple fiber from Example 2 is fed into lab-scale carding equipment (a Davis & Furber carding machine available from Davis & Furber of Andover, Mass.). The carded web is crosslapped onto a scrim and tacked together by a needle loom. A web is then crosslapped onto the other side of the scrim and needled again. The felt is needle punched several times to interlock the staple fibers to the scrim sufficiently. This product is then heat set while being restrained in the cross machine direction for several minutes to improve the thermal stability. The final felt has a weight per unit area of about 1200 $g/m^2$, an air permeability of about 0.75 m/min @ 12 mm water gauge, and a thickness of about 2 mm.

The needle felt is coated with a fluorinated ethylene propylene copolymer (FEP) aqueous dispersion (T120 available from E. I. duPont de Nemours and Co.). The felt is then dried in loop dryer oven at 200° C. with a dwell time of 8 min. The dried aqueous dispersion add on is 3.5% by weight.

A layer of porous expanded PTFE membrane with an air permeability of 8.8 m/min @20 mm water gauge is laminated to the coated side of the felt. The felt is subject to sufficient heat, pressure, and dwell time to soften the dried FEP aqueous dispersion. The resulting fabric laminate had good strength between the porous expanded PTFE membrane and the felt, and an air permeability of 2.8 m/min @12 mm water gauge with excellent filtration efficiency of solid particulates.

The inventive nonwoven fabric laminate is tested to determine its catalytic gas removal efficiencies.

The current invention can be used in many flue gas cleaning processes especially to clean emissions of stationary sources. The filter material can be used to make filter devices such as filter bags or cartridges. In most cases these filters have to collect substantial amounts of dust that is generated in the combustion process. After short collection times between 1 and 60 minutes the collected dust layer on the dirty side of the filter material increases the pressure drop across the filter and the filter has to be cleaned. During this cleaning cycle that involves a high energy input into the filter the outer dust layer falls off and a new particulate filtration cycle can begin. The catalytic conversion of pollutant gases will continue uninterrupted. Most catalytic filter materials that have been proposed to date consist of a regular woven or non-woven filter material in which the catalytically active particles are inserted as a foreign body. These materials are not commercially available. During the cleaning cycle in which the filter material is exposed to high energy input and flexing these particles may abrade the host fibers and degrade the life of the filter. In the current invention the catalyst particles are an integral part of the filter material and have no negative effects on the lifetime of the filter material. Furthermore, all particle insertion devices have the disadvantage that they increase the pressure drop of the filter material and can get in contact with catalyst polluting dusts. In the current invention the catalyst particles do not interfere with the particle filtration process at all and can not be deactivated by the pollutant dusts. Finally, the present invention allows for the ready combination of filtration and catalytic functions, presently performed by separate apparatus, into a single easily employed unit.

The current catalyst works well at temperatures of 150° to 250° C. and preferably between 200° and 250° C.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A catalytic filter for use in a fluid stream that comprises:

multiple fibers, each comprising catalytic particles attached to nodes and fibrils within a fibrillated polymer;

the multiple fibers of fibrillated polymer and catalytic particles combined to form a coherent catalytic filter material;

a sheet of microporous membrane mounted on at least one side of the coherent catalytic filter material, the sheet having a pore structure sufficiently small enough to serve as a barrier to isolate particles in the fluid stream away from the catalytic filter material.

2. The catalytic filter material of claim 1 wherein the coherent catalytic filter material comprises multiple fibers woven into a catalytic woven fabric.

3. The catalytic filter material of claim 1 wherein the coherent catalytic filter material comprises multiple staple fibers adhered together in the form of a catalytic felt.

4. The catalytic filter material of claim 1 wherein the felt comprises a scrim with the staple fibers needled therein.

5. The catalytic filter material of claim 1 wherein the microporous membrane includes catalytic particles therein.

6. A catalytic filter for use in a fluid stream that comprises:

multiple fibers, each comprising catalytic particles attached to nodes and fibrils within a fibrillated polymer;

the multiple fibers of fibrillated polymer and catalytic particles combined to form a coherent catalytic filter material, the coherent filter material comprising a thickness of at least 1 mm.

7. The catalytic filter of claim 6 wherein at least one sorptive layer is included in the filter.

8. The catalytic filter of claim 6 that comprises:

a sheet of microporous membrane mounted on at least one side of the coherent catalytic filter material, the sheet having a pore structure sufficiently small enough to serve as a barrier to isolate particles in the fluid stream away from the catalytic filter material.

9. The catalytic filter of claim 8 wherein the microporous membrane includes catalytic particles therein.

10. The catalytic filter of claim 9 wherein the microporous membrane includes sorptive particles therein.

11. A method for producing a catalytic filter material that comprises:

providing a membrane comprising catalytic particles and fibrillated polymer having polymeric nodes and fibrils, wherein the catalytic particles are attached to the nodes and fibrils;

towing the membrane into multiple fibers;

combining the multiple fibers into a coherent catalytic filter material.

12. The method of claim 11 that further comprises:

mounting a sheet of microporous membrane on at least one side of the coherent catalytic filter material, the sheet having a pore structure sufficiently small enough to serve as a barrier to separate at least one of particles and contaminants away from the catalytic filter material.

13. The method of claim 12 that further comprises providing as the sheet of microporous membrane a polymer having catalytic particles embedded therein.

14. The method of claim 11 that further comprises:

cutting the fibers to form staple fibers; and combining the staple fibers into the coherent catalytic filter material by needling the staple fibers into a backing material to form a felt.

15. The method of claim 11 that further comprises:

weaving the multiple fibers into the coherent catalytic filter material so as to form a woven catalytic fabric.

16. The method of claim 11 that further comprises:

providing at least one sorptive layer; and mounting the sorptive layer in the filter.

* * * * *